United States Patent [19]

Artzer

[11] 4,336,676
[45] Jun. 29, 1982

[54] COMPOSITE STRUCTURAL PANEL WITH OFFSET CORE

[75] Inventor: Richard F. Artzer, Riverside, Calif.

[73] Assignee: Covington Brothers, Inc., Fullerton, Calif.

[21] Appl. No.: 23,590

[22] Filed: Mar. 26, 1979

Related U.S. Application Data

[63] Continuation-in-part of Ser. No. 857,235, Dec. 5, 1977, Pat. No. 4,226,067.

[51] Int. Cl.³ .................................................. E04C 2/26
[52] U.S. Cl. .............................. 52/309.7; 52/309.11; 52/309.12; 52/405; 52/650; 52/694; 29/428; 29/446; 29/460
[58] Field of Search .................. 52/694, 309.4, 309.11, 52/404, 407, 344, 349, 350, 562, 405, 410, 309.7, 309.12; 404/47; 29/428, 446, 460

[56] References Cited

U.S. PATENT DOCUMENTS

| | | |
|---|---|---|
| 427,914 | 5/1890 | Schillinger . |
| 978,002 | 12/1910 | Burchartz . |
| 1,042,808 | 10/1912 | MacManus . |
| 1,042,885 | 10/1912 | Budd et al. . |
| 1,234,244 | 7/1917 | Willsie . |
| 1,507,425 | 9/1924 | Reed et al. . |
| 1,555,914 | 10/1925 | Denning . |
| 1,694,081 | 12/1928 | Reed . |
| 1,795,716 | 3/1931 | Eckland . |
| 1,809,504 | 6/1931 | Carvel . |
| 1,831,897 | 11/1931 | Wagner . |
| 1,908,050 | 5/1933 | Reed . |
| 1,945,933 | 2/1934 | Chilowsky et al. . |
| 2,057,017 | 10/1936 | Ganahl . |
| 2,061,633 | 11/1936 | Muller . |
| 2,063,309 | 12/1936 | Graef . |
| 2,140,283 | 12/1938 | Faber . |
| 2,192,183 | 5/1940 | Deutsch . |
| 2,262,899 | 11/1941 | Mechlin . |
| 2,268,251 | 12/1941 | Haux . |
| 2,280,882 | 1/1958 | Johnson . |
| 2,291,116 | 7/1942 | Streater . |
| 2,324,435 | 7/1943 | Smith . |
| 2,365,181 | 12/1944 | Fentress . |
| 2,368,047 | 1/1945 | Southwick . |
| 2,477,394 | 7/1949 | Spiker .................................. 52/694 |
| 2,522,116 | 9/1950 | Hayes . |
| 2,540,349 | 2/1951 | Reed . |
| 2,618,960 | 11/1952 | Orzel . |
| 2,718,138 | 9/1955 | Jones . |
| 2,744,042 | 5/1956 | Pace . |
| 2,831,232 | 4/1958 | Lawson . |
| 2,939,206 | 6/1960 | Keller . |
| 3,000,144 | 9/1961 | Kitson . |
| 3,010,493 | 11/1961 | Fingerut . |
| 3,082,486 | 3/1963 | Khawam et al. . |
| 3,091,998 | 6/1963 | Wehr et al. . |
| 3,093,935 | 6/1963 | Dunn . |
| 3,157,144 | 11/1964 | Jarnett . |
| 3,158,925 | 12/1964 | Edge . |
| 3,232,017 | 2/1966 | Prusinski et al. . |
| 3,239,982 | 3/1966 | Nicosia .............................. 52/309.12 |
| 3,245,328 | 4/1966 | Fassbinder ........................... 404/47 |
| 3,249,659 | 5/1966 | Voelker . |
| 3,270,103 | 8/1966 | Kurtz . |
| 3,295,278 | 1/1967 | Muhm . |
| 3,305,991 | 2/1967 | Weismann . |
| 3,363,371 | 1/1968 | Villalobos . |
| 3,388,509 | 6/1968 | Mora . |
| 3,435,567 | 4/1969 | Tyson . |
| 3,475,876 | 11/1969 | Oroschakoff ........................ 52/694 |
| 3,484,331 | 12/1969 | Betz . |
| 3,488,090 | 1/1970 | Bahr . |
| 3,494,088 | 2/1970 | Korner . |
| 3,522,685 | 8/1970 | Oroschakoff . |
| 3,555,131 | 1/1971 | Weismann ....................... 52/309.12 |
| 3,832,815 | 9/1974 | Balaz et al. . |
| 3,838,241 | 9/1974 | Weisman . |
| 3,879,908 | 4/1975 | Weismann .............................. 52/30 |
| 3,990,203 | 11/1976 | Greaves . |
| 4,079,560 | 3/1978 | Weismann . |
| 4,104,842 | 8/1978 | Rockstead et al. . |
| 4,120,330 | 10/1978 | Weismann . |
| 4,125,981 | 11/1978 | MacLeod et al. . |

FOREIGN PATENT DOCUMENTS

| | | |
|---|---|---|
| 10181 | of 1927 | Australia . |
| 719238 | 10/1965 | Canada . |
| 615263 | 7/1935 | Fed. Rep. of Germany . |
| 1150176 | 1/1958 | France . |
| 1355456 | 2/1964 | France . |
| 921497 | 3/1963 | United Kingdom . |
| 980953 | 1/1965 | United Kingdom . |

*Primary Examiner*—John E. Murtagh

*Attorney, Agent, or Firm*—Gausewitz, Carr, Rothenberg & Edwards

[57] ABSTRACT

A modular light-weight structural panel is made by stacking in consecutive alternation a number of long, narrow foam plastic filler elements with a number of substantially flat lattice structures. The sub-assembly is laterally compressed to cause each of the lattice structures to be pressed into and partially embedded in mutually abutting surfaces of adjacent ones of the filler elements. While in such compressed condition cross members are welded to side portions of the lattice structures that protrude beyond the filler element surfaces to thereby hold the assembly in its pressed condition with the lattice structures embedded in the filler elements and surfaces of adjacent filler elements in close face-to-face contact with one another. Thereafter, the filler elements are bodily displaced toward one side of the panel so that outer sides of the filler elements are positioned substantially at the panel side and inner sides of the filler elements are displaced inwardly of the panel side, thereby enabling a relatively thick exterior coating to be applied to one side of the panel and a relatively thin interior coating or finishing sheet to be applied to the other side. In a hollow core embodiment, each filler element is made in two sections which, after welding of the cross members, are outwardly displaced relative to each other to position both sections of each filler element at an outer surface of the panel, thereby providing a hollow core panel, both sides of which may be coated with relatively thin interior coatings.

26 Claims, 18 Drawing Figures

COMPOSITE STRUCTURAL PANEL WITH OFFSET CORE

This application is a continuation-in-part of my application Ser. No. 857,235, filed Dec. 5, 1977, now U.S. Pat. No. 4,226,067 for Structural Panel, the disclosure of which is incorporated by this reference as though fully set forth herein.

BACKGROUND OF THE INVENTION

The present invention relates to structural panels and more particularly concerns such panels and methods for their manufacture that employ filler materials and reinforcing structures arranged to provide a unitary panel structure.

Light-weight plastic materials, including the many different types of foamed synthetic resins and expanded foams, such as urethanes, polystyrenes and the like, have a number of properties that are highly desired in building materials for various types of structures such as walls, roofs and the like. These properties include light-weight, exceedingly low thermal conductivity, resistance to abrasion, impermeability to moisture, and acoustic insulation. However, such materials generally have insufficient structural strength for some applications and, therefore, must be combined in some manner with other materials having satisfactory structural properties.

Various configurations employing combinations of light-weight cellular plastic foam or expanded plastic bodies and rigid load-bearing structural elements have been suggested in the past for providing structural building panels that can effectively utilize the desirable properties of the cellular materials. Typical of such prior arrangements are the U.S. patents to Weismann U.S. Pat. Nos. 3,305,991, 3,555,131 and 3,879,908. In the first two of these patents, a three-dimensional wire matrix is first manufactured and thereafter a light-weight plastic core is provided by pouring a liquid foaming plastic which foams in place within the framework. However, because the cellular material is foamed in place, a form must be provided to define the bottom surface of the foam core. Difficulties have been encountered in maintaining the form in a planar configuration and in positioning the form at a precise distance from the outer surface of the framework. Further, since no form is generally employed to define the surface of the foamed-in-place core (the panel core is foamed in place within the structural framework, with the panel in a horizontal position according to the teachings of the patents), the core will exhibit an outer surface that is far from the desired planar condition. It will exhibit a surface of such irregularity and imprecise location that the foamed core may actually contact the outer elements of the structural framework in many places thereby preventing a subsequent coating from completely encompassing such outer portions of the framework.

The later patent to Weismann, U.S. Pat. No. 3,879,908, avoids some problems of the use of foamed-in-place material. After building a completed three-dimensional wire framework, the patentee here inserts a plurality of insulative elements through passages that are formed and disposed wholly within the structural framework. These insulative elements must be dimensioned so as to freely and easily pass between adjacent elements of the structural framework and when positioned will not have adjacent surfaces in contact with one another. Thus, impermeability to moisture, sound and heat is significantly degraded. Moreover, the relatively free insulative elements add little to the strength of the completed composite panel. After such insertion, a bonding agent is employed in the arrangement of the U.S. Pat. No. 3,879,908 to secure the insulative elements in position within the lattice so that the final coatings may be applied to the panel surfaces after the panel has been erected in the field.

In my co-pending application for Structural Panel, Ser. No. 857,235, filed Dec. 5, 1977, there is described a composite structural panel and method for its manufacture that eliminates or avoids many of the above-mentioned problems. In the arrangement of my co-pending application, a number of pre-formed, long, narrow filler elements are stacked in consecutive alternation with flat trusses to form a panel subassembly that is thereafter compressed to embed the strut members of the wire lattice into the faces of the mutually contacting foam filler elements. While in such compressed condition, cross members are welded to the truss runners to hold the panel in assembled condition with the filler elements positioned substantially symmetrically of the panel and spaced equally from opposite surfaces of the panel.

The panels constructed according to my co-pending application have been successfully, efficiently and economically employed in the construction of a number of houses. After erection at the building site, these panels have a coating of concrete or plaster applied to entirely cover both panel surfaces, completely embedding the protruding wire structure therein and thus forming the exterior surface of the completed panel.

For a panel of a thickness of three inches before the application of the finished coating (which is the thickness of panels presently constructed according to the teachings of the co-pending application) and foam elements of two to two-and-one-half inch square cross section, a concrete or plaster coating of approximately seven-eights to one inch is applied to each side for panel finishing.

It is found that for many applications a total thickness of concrete of nearly two inches is not required either for panel strength or protection or to meet any code or Governmental regulations. Further, in the erection of such panels, they are commonly braced by means of diagonal braces extending out from the panel on each side, both inside and outside. These braces form obstacles encountered by the workmen in moving concrete application hoses about for the application of coatings.

Where the panel is to be used as a roof panel, the interior coating of the panel must be applied to a horizontal or somewhat inclined surface that may form a ceiling of the completed structure. To apply a coating to such a downwardly facing surface in a thickness of nearly one inch is difficult or impossible to achieve in a single application with many coating materials.

In use of composite structural panels, primary considerations are cost, both of materials and labor, and cost of erection and installation. Thus, for those walls such as interior walls which may require less structural strength, coatings other than concrete are desirably employed and walls with hollow cores are preferable because of the decreased cost of materials. Hollow core elements such as the paper tubes described in Weismann U.S. Pat. No. 3,879,908, provide some of the advantages of the hollow core but do entail considerably increased expense because of the significantly greater cost of fabrication of such hollow core elements.

Accordingly, it is an object of the present invention to avoid or eliminate above-mentioned problems and to provide a structural panel of high strength and low cost that permits rapid, efficient erection and coating in the field, the panel having the desired structural, moisture, acoustic, thermal and other desired characteristics.

SUMMARY OF THE INVENTION

In carrying out principles of the present invention in accordance with a preferred embodiment thereof, a plurality of elongated filler elements and substantially flat lattice structures or trusses are stacked in consecutive alternation with the sides of the filler elements spaced inwardly of laterally outermost portions of the lattice structures. The stack is compressed to at least partially embed the lattice structures in the filler elements and the lattice structures are secured to one another. Thereafter, at least portions of some of the filler elements are laterally shifted outwardly to a displaced position in which outer sides of the shifted portions at one side of the panel are positioned substantially at laterally outermost portions of the lattice structures at that panel side. Such a displaced core panel has the core elements positioned nearly flush with a first side of the panel and spaced considerably inwardly of the second side of the panel so that a relatively thick exterior coating may be applied to the second side of the panel and a relatively thin interior coating or finish sheet may be applied to the first panel side. For use as a hollow core interior wall, the filler elements are made in two sections which, after compression of the stack of alternate trusses and filler elements, and after interconnection of the trusses, are laterally shifted outwardly relative to one another so that each section is then positioned substantially flush with respective outer sides of the panel. Thus the interior of the panel, between the outwardly displaced core filler element sections, is hollow.

Projections are formed on the truss strut members to engage the laterally shifted filler elements and to mechanically hold these in shifted position. In a preferred arrangement, these projections are formed by an intermediate truss wire extending longitudinally of the truss and spaced inwardly from an outermost longitudinal truss wire, thereby to provide additional strength to the exterior coating of concrete or the like in which the intermediate truss wire may be embedded.

DETAILED DESCRIPTION

Figure 1:
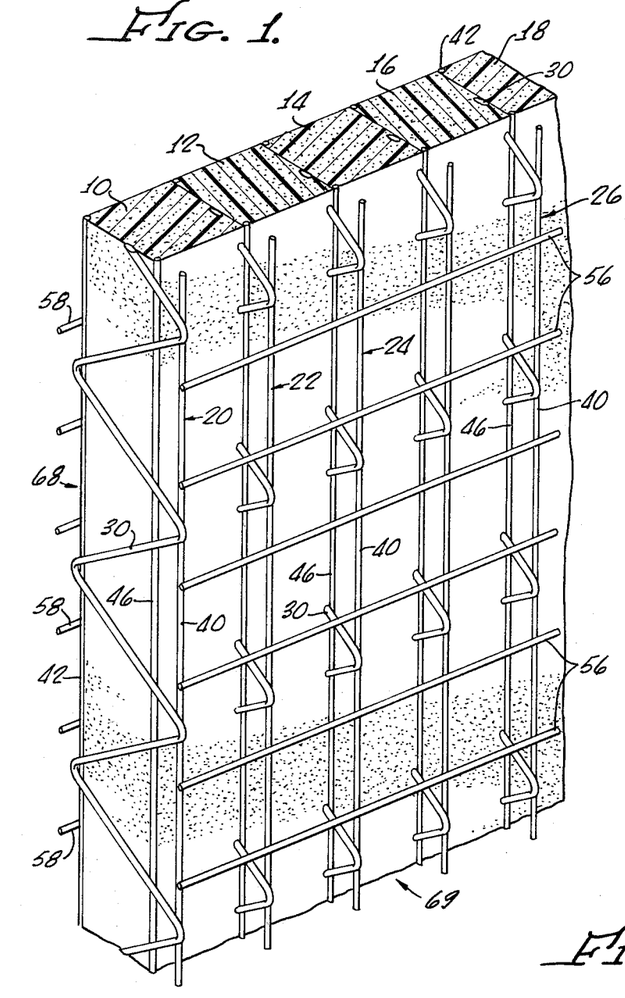
FIG. 1 is a perspective view of portions of a structural panel embodying principles of the present invention.

As shown in FIG. 1, a composite foam and wire reinforced structural panel embodying principles of the present invention has a plurality of elongated filler elements including elements such as those designated at 10, 12, 14, 16, 18, all having their adjacent surfaces in substantially complete face-to-face contact except for certain points to be described hereinafter. In the embodiment of FIG. 1, each filler element has a length equal to the length of the panel, which for a common panel size is eight feet, has a thickness as measured in the direction of the panel thickness of approximately two to two-and-one-quarter inches, and a width as measured in the direction of the width of the panel of two to two-and-one-quarter inches. A cross section of each filler element of this embodiment is substantially square and each face of the filler element is planar and at right angles to a pair of adjacent faces. Thus, in assembled condition, with the filler elements aligned with one another as illustrated in FIG. 1, corresponding element faces such as the faces that are substantially parallel to the largest panel surface lie in a common surface which is illustrated as being planar. Although the illustrated configuration is preferred, other than planar surface configurations may be employed. It is presently preferred to employ twenty-four, two-inch-wide filler elements for a panel, thereby to provide a finished panel of about four feet wide, after assembly and compression as will be described below.

Interposed between filler elements of each adjacent pair of filler elements are rigid elongated lattice structures or trusses, typical ones of which are designated at 20, 22, 24 and 26. The lattice structures are substantially planar or essentially two-dimensional, and have a depth greater than the thickness of any one of the filler elements.

In the finished panel, core elements are laterally offset relative to the longitudinally extending center of the trusses, so that one side of each of the core elements has points lying in a common plane substantially at one side of each truss and the other side of each core element has points lying in a common plane at the other side of the trusses.

Figure 2:
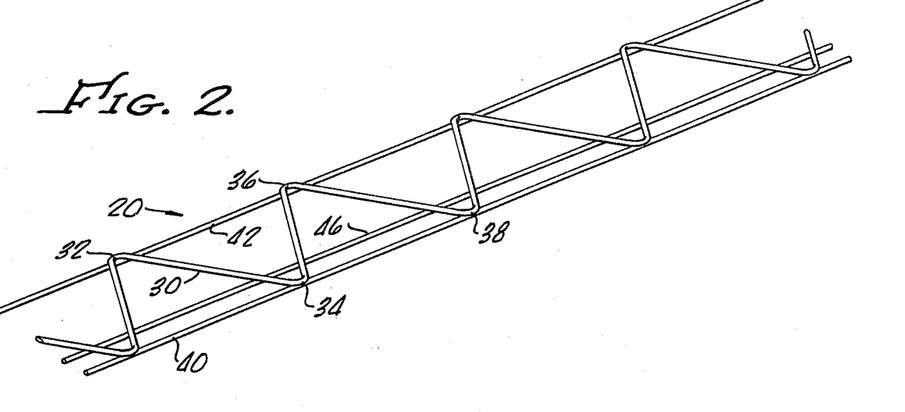
FIG. 2 is a perspective view of a section of a truss employed in the panel of FIG. 1.

Each lattice structure is identical to each other lattice structure and, as illustrated in FIG. 2, is formed of a relatively rigid sinuously bent continuous wire 30 having a zigzag configuration that defines alternate apices such as those indicated at 32, 34, 36 and 38. Fixed to the sinuous rod or wire 30 is a pair of mutually spaced parallel side wires 40, 42 that are spot-welded to the wire 30 at the apices on respectively opposite sides of the truss, at apices 34, 38 for wire 40 and at apices 32, 36 for wire 42. The side wires are both welded to the same side of the strut wire and thus lie in the same plane.

A third or intermediate longitudinally extending wire 46 extends between the side wires 40, 42 on the same side of the strut wire 30 as are the other side wires, and is welded to each diagonal portion of the strut wire or, in other words, to each strut member of the truss. The intermediate wire 46 is laterally offset to one side of the truss so that it is considerably closer to the side wire 40 than it is to side wire 42 for purposes to be described below.

Figure 3:
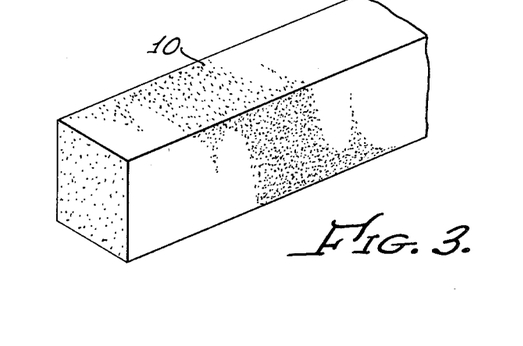
FIG. 3 is a perspective view of a portion of a core element employed in a panel of FIG. 1.

Each filler element, as illustrated in FIG. 3, is formed of a long rectangular cross section cellular foam material, such as an expanded polystyrene, polyurethane or other similar material of any of the types described in the above-identified co-pending application. In a presently preferred configuration, the filler elements have a width (measured from truss to truss) of two inches and a thickness (measured in the direction of the thickness of the panel) of two-and-one-quarter inches. For a four-foot-by-eight-foot panel, each filler element and each truss is eight feet long.

Figure 4:
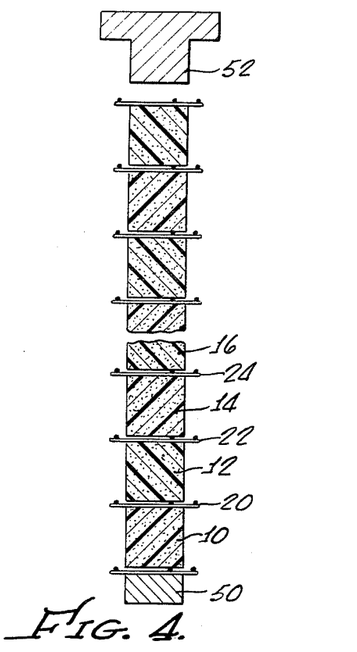
FIGS. 4 and 5 illustrate the manner of assembly and interconnection of panel components.
Figure 7:
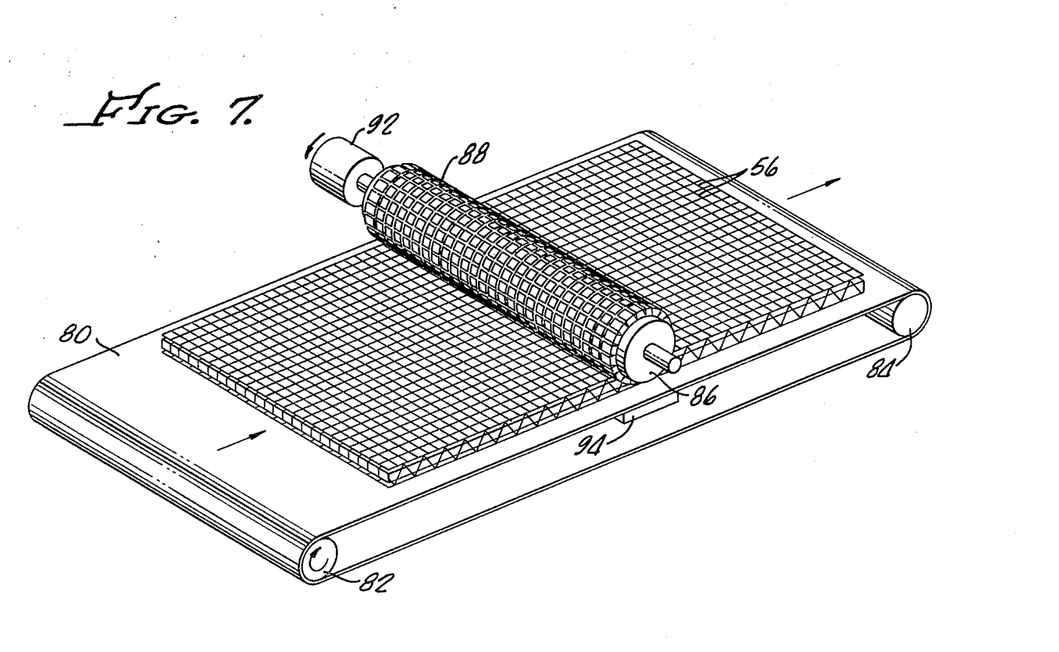
FIG. 7 illustrates an exemplary arrangement for laterally displacing filler elements of the panel of FIG. 6.

The composite panel shown in FIG. 1 is manufactured by stacking a number of the elongated filler elements and a number of the lattice structures in consecutive alternation with the sides of the filler elements spaced inwardly of the laterally outermost portions, namely the apices of the strut wires of the lattices. As illustrated in FIG. 4, the stack of interleaved filler elements and lattice structures is relatively loosely assembled so that it may be compressed between a fixed lower support 50 and a movable upper pressure arm 52. The arm 52 is then forced downwardly to compress the stack. The compression drives the relatively slender wires of the lattice structures into the adjacent surfaces of the foam filler elements whereby the latter are deformed along the lines of contact with the lattice structures and the interposed wires of the lattice are completely embedded in the facing surfaces of the filler elements. The compressed pre-assembly attains the configuration of FIG. 5 which schematically shows the pressure exerted on the members 50 and 52 to compress the stack therebetween. In this compressed condition, the entire flat facing surface of each filler element, except for the interposed truss wires, is in flat and full face-to-face contact with the surfaces of filler elements on either side (except for end elements). While held in this compressed position, wires that provide a pair of cross members, such as wires 56, 58, are firmly grasped in clamps 60, 62, being drawn over guide rollers 64, 66 from wire rolls (not shown). The wire rolls are restrained to restrain further unrolling of the wire and the clamps 60, 62 are pulled downwardly as indicated by the arrow in FIG. 5 to thereby tension the wires 56, 58. Each of the cross wires then is welded to the lattice structure side wires at each point of contact between a cross wire and a lattice side wire. A plurality of such cross wires are employed on each side of the panel, spaced about two inches apart, as can be seen in FIGS. 1 and 7. After welding, the cross wires are severed at points adjacent the end lattice structures and the stack is released from the compression of members 50, 52. Even though released from this external compressive force, the cross wires hold the assembly in its compressed condition.

Figure 5:
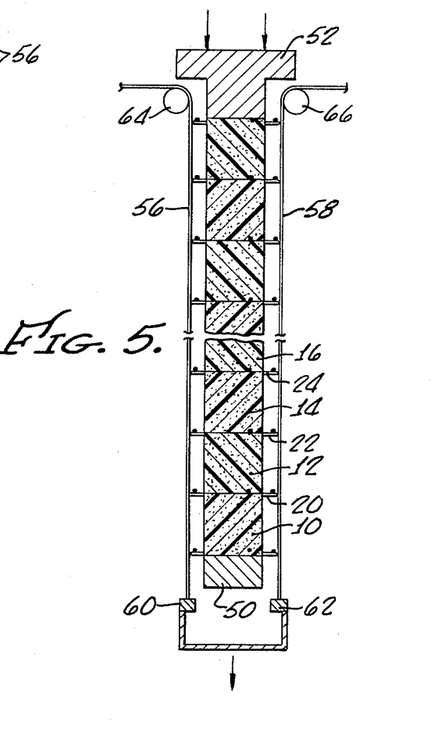
Figure 6:
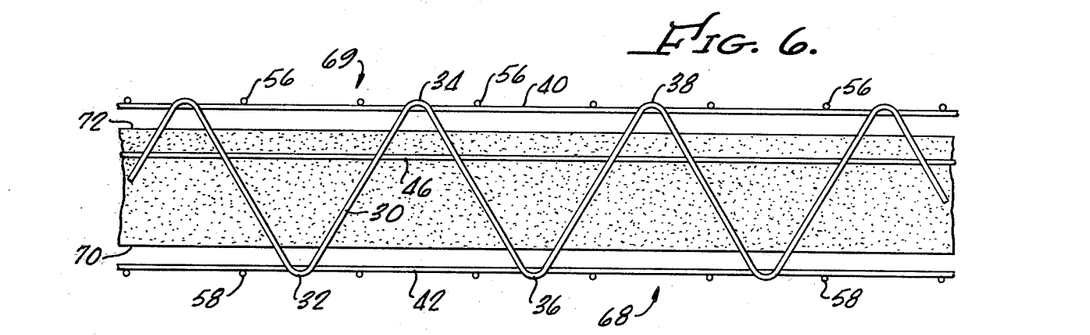
FIG. 6 is a longitudinal sectional view of a group of assembled and interconnected panel components after welding of the cross wires but prior to lateral displacement of the filler elements.

It will be observed that in the loose assembly of FIG. 4 and the compressed assembly of FIGS. 5 and 6, each core filler element is positioned substantially midway between the laterally outermost sides of each lattice structure. This nearly symmetrical positioning is merely for convenience, since it is only necessary that the filler elements, as initially stacked, be spaced inwardly of the outermost points of the trusses by an amount sufficient to enable proper welding of the cross wires. If the filler elements are initially stacked too closely to the outer sides of the trusses, it may not be possible to insert welding backup bars behind the truss side wires as may be needed for resistance welding. Furthermore, the filler elements may be burned if they are too close to the welding electrode. However, if the side wires and cross wires are sufficiently strong or otherwise supported to resist weld electrode pressure (which may be as much as 100 pounds) without backup, or if other means are employed to affix the cross wires, and if adverse effects of the welding or other wire joining process on the proximate filler elements may be acceptable or may be avoided, the filler elements may be initially stacked in their final offset position and the step of laterally shifting the filler elements as described below in connection with FIGS. 7, 8 and 9 may be eliminated.

Figure 8:
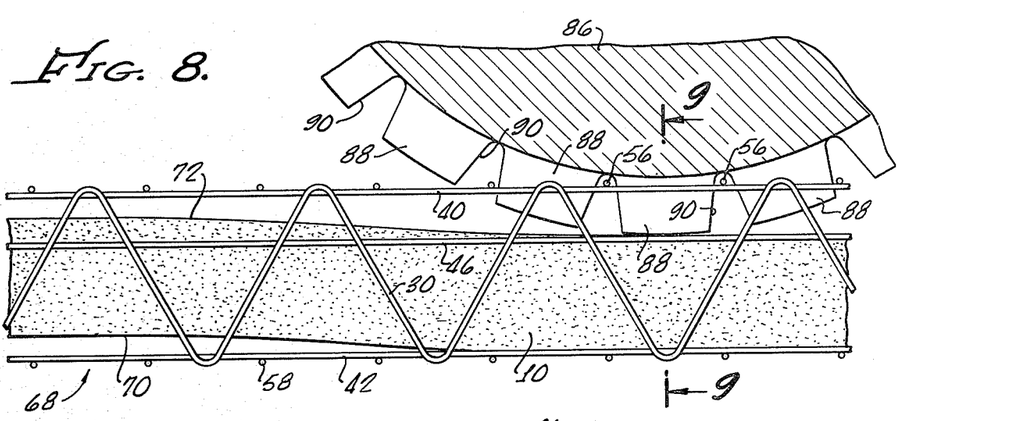
FIG. 8 is an enlarged fragmentary view showing operation of the filler element displacing roller.
Figure 9:
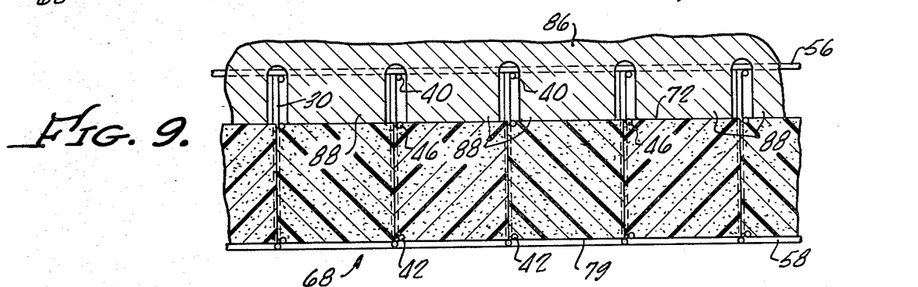
FIG. 9 is a section taken in line 9 of FIG. 8.

The panel as fabricated to this point (fabrication will be completed as will be described in connection with FIGS. 7, 8 and 9) comprises a three-dimensional wire matrix made up of the several mutually spaced two-dimensional lattice structures or trusses rigidly interconnected by the cross wires 56, 58, the core being formed of the several light-weight filler elements disposed within the matrix. The matrix has a first surface 68, which is the four-by-eight-foot surface in a four-by-eight-foot panel, formed of the truss runner wires 42, strut member apices 32, 36 and cross wires 58. The matrix has a second opposite matrix surface 69 formed of truss runner wires 40, apices 34, 38 and cross wires or member of 56. In the as yet unfinished condition shown in FIG. 6, the several filler elements, disposed between the first and second matrix surfaces, themselves have a first core surface 70 which is adjacent to but spaced from the first matrix surface 68, and a second core surface 72 which is adjacent to but spaced inwardly of the second matrix surface. The panel in this condition is the same as the fully completed pre-fabricated panel of my prior application Ser. No. 857,235.

By the apparatus and method illustrated in connection with FIGS. 7, 8 and 9, the entire core, all of the foam filler elements forming the core, will be displaced laterally until the first core surface 70 is positioned at the first matrix surface 68 and the second core surface 72 is spaced further inwardly from the second matrix surface 69 and positioned substantially at the intermediate truss wires 46. To accomplish this core shifting, many different types of apparatus may be employed. It is merely necessary to firmly press upon the surface 72 of each foam core element to cause it to move toward the first matrix surface 68. It will be recalled that because of the compression accomplished as illustrated in FIG. 5, wires of the trusses are embedded in the contacting face-to-face surfaces of the filler elements. These surfaces remain in such contact during the core shifting as the truss wires in effect move between the surfaces, remaining embedded therein. Therefore, this laterally outward displacement causes the truss wires embedded in the contacting surfaces of adjacent filler elements to move over these surfaces, depressing surface portions progressively during this movement until the filler elements reach their outermost positions.

In a presently preferred embodIment, outward shifting of the filler element cores is achieved by placing the panel upon a continuous conveyor belt 80 (FIG. 7) that is entrained over idler rollers 82 and 84. Disposed across an intermediate portion of the conveyor 80, close to its upper surface but spaced therefrom, is a roller 86 extending for the full width of the conveyor belt which is slightly more than the full width of the panel. The roller has a plurality of circumferentially spaced, longitudinaly extending rows of discrete, longitudinally spaced pressure feet 88. The longitudinal rows are circumferentially spaced to provide longitudinally extending channels 90 (FIG. 8) extending for the length of the roller. The roller is continuously driven by a motor 92.

To laterally shift the filler elements of the panel, a completely assembled and welded panel in the condition illustrated in FIG. 6 (e.g., after compression of the stack and welding of the cross wires) is placed upon the conveyor 80 with one end thereof adjacent the rotating roller 86. The panel is pushed toward the roller which continues to rotate until one of the longitudinal channels 90 straddles the end-most one of the matrix cross wires 56. Continued rotation of the roller draws the panel, together with the conveyor 80, beneath the roller so that the several rows of pressure feet 88 will respectively contact the core surface 72 and press these downwardly or laterally outwardly of the panel matrix. Each pressure foot 88 has its end surface concentric with the roller axis so as to apply even pressure to the core elements. Pressure of the roller against the panel is resisted by a rigid transversely extending fixed backup plate 94 over which the conveyor 80 rides as it is pulled with the panel beneath the roller.

The distance between the outermost surfaces of each of the pressure feet 88 and the lowermost surface 68 of the matrix, as supported by the belt 80 and backup plate 94, is such that each of the filler elements is displaced downwardly (laterally outwardly with respect to the wire matrix) until the core surface 70 is substantially at the matrix surface 68. As can be seen in FIG. 9, the surface 70 has been shifted outwardly upon completion of the core shifting until it lies in a plane tangent to the outer sides of truss runner wires 42 and tangent to the inner sides of the cross wires 58. One outermost corner of each of the filler elements is compressed and remains compressed, forming a groove that receives the truss runner wire 42. The foam core elements have some degree of shape memory and thus, as the embedded truss wires are moved along the facing surfaces of the elements, additional foam surface areas are compressed, and those portions of the surfaces that are no longer subject to the compressive force of the truss wires tend to exapnd to regain their initial configuration. With many types of foam material, when the shifting has been completed the adjoining surfaces of filler elements are once again in full face-to-face contact except for the areas contacting the interposed truss wire in final configuration of the panel.

The intermediate truss wires 46 are spaced from the truss runner wires 42 by a distance substantially equal to but slightly less than the thickness of each of the foam filler elements. Therefore, in the course of shifting of the elements from the position of FIG. 6 to the final position illustrated in FIG. 9, the filler elements in effect "snap" into position as the surfaces 72 pass or nearly pass the intermedite wires 46 which project inwardly into the space between adjacent trusses. Thus, in the final shifted position of the filler elements, the surface 72 lies in a plane that is tangent to the outermost sides of the intermediate longitudinally extending wires 46. In effect, these intermediate wires 46 are projections on the trusses that mechanically engage the filler elements and securely retain these in their laterally shifted final position. Upon completion of the shifting, the intermediate wires 46 are partially embedded in and project into corner edges of the respective filler elements at the core surface 72. If deemed necessary or desirable, the filler elements may be displaced laterally outwardly by a somewhat greater amount so that the core surface 70 lies in a plane that is tangent to the outermost edges of the cross wires 58 so that the latter are partially embedded in the core surface 70. However, it is found that the described arrangement is satisfactory for most uses of the panel and, moreover, will provide greater exposed area of the matrix wires for contact with a final coating to be applied to the prefabricated panel after it has been installed. Preferably the filler element thickness and the amount of outward displacement is such as to expose the major area of the intermediate wires 46 to the exterior coating that will be applied (at a later time and at the construction site) at the panel side 69. The space between the inwardly shifted core surface 72 and the laterally outermost elements (wires 56) has been greatly increased to permit a thicker exterior coating to be later applied.

After passing under the roller 86, the prefabrication of the panel is complete and it may be transported to a building site and erected for application of a finished coating of a selected one of many different types.

Figures 10, 11:
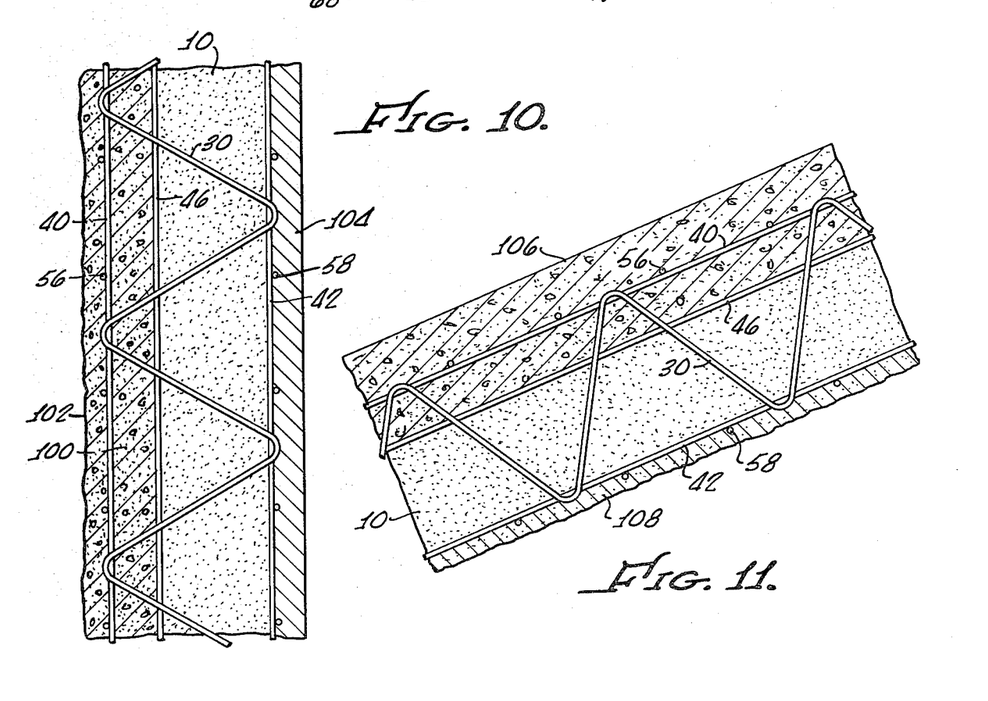
FIG. 10 illustrates a panel constructed according to FIGS. 1 through 9 after receiving its exterior and interior coatings.
FIG. 11 illustrates a similar panel employed as a roof panel after receiving its exterior and interior coatings.

FIG. 10 illusrates utilization of the panel in an exterior/interior wall construction. In such an arrangement, a number of the prefabricated panels are erected and connected together by wire clips or other connecting means. The erected wall panels may then be braced by a number of diagonal braces (not shown) that extend from an intermediate portion on the inside of the panel (matrix surface 68 is the inside of the panel) to the ground. Alternatively, after erection of several panels as vertical wall structures, roof supporting beams or roof trusses (not shown) may be affixed to the panels to provide support therefor. No external diagonal bracing is required. After erection of the panels in the field and completion of the internal bracing, an exterior coating 100 of gunnite or other concrete material, stucco or other plaster is applied in contact with the inwardly offset core surface 72, in contact with exposed surfaces of the intermediate truss wires 46 and with all outer portions of the trusses. The exterior coating 100 is applied with such a thickness as to provide an exterior surface 102 that is positioned outwardly of the outermost portions of the trusses, thereby to completely protect and embed all of the truss structure that protrudes from the foam core.

It will be noted that the intermediate truss wires 46 not only provide core retaining projections physically engaging the core elements and retaining these in their laterally offset position, but each actually forms the second side of a narrow truss structure that includes a pair of runner wires 40 and 46 securely interconnected by those portions of the strut wire 30 that extend between the wires 40 and 46. Further, this relatively narrow but complete truss formed by wires 40, 46, and 30 is completely or nearly completely embedded within the exterior coating 100. Thus the strength of the coating 10 is greatly increased by the embedded and complete reinforcing truss wires 40, 46 and 30. Without the use of the intermediate wire 46, the exterior coating of concrete or the like is only partially reinforced by a single longitudinal wire and portions of the relatively long diagonally extending strut members. The described arrangement provides a greater thickness of exterior coating (as compared to a panel with a centrally positioned core) and this thicker coating has greater strength at least in part because of the greater strength of the complete truss that reinforces it.

After the exterior coating 100 has completely set and cured, the wall has full or nearly full structural strength and the building may be completed. Any suitable type of interior coating may be applied to the interior matrix surface 68. Such interior coating may be sprayed or troweled on interior plaster, a rigid drywall or plywood, or other type of wall paneling, rigid or semi-rigid interior coating sheet. Rigid interior coating sheets such as plywood or drywall may be applied with a suitable viscous adhesive or wall mastic. The interior coating 104 need have but relatively little thickness, and thus a common plaster may be readily applied by spraying or trowelling. The described panel, upon completion in the field, utilizes less of the more expensive exterior coating than prior panels, provides better reinforcement of the exterior coating, allows for the application of a greater variety of interior coatings, and significantly decreases cost and effort of application of both of these coatings.

The described panel may also be utilized as a roof panel as illustrated in FIG. 11. For such an application, the panel is positioned in a desired horizontal or inclined position, properly supported from the wall or other cross structures, and suitably braced on its lower side. Then an exterior coating such as concrete, gunnite, stucco or the like 106 is applied to the exterior (upper) surface of the panel to embed the complete narrow truss formed by wires 40, 46 and those portions of the strut wire 30 extending therebetween. Because the core surface 70 of this panel is close to the outer surface 68 of the matrix, a relatively thin coating of ceiling material may be readily applied. Thus, a conventional acoustic ceiling plaster may be sprayed on the downwardly facing interior surface of the panel or other types of interior coatings may be readily applied thereto.

Figure 17:
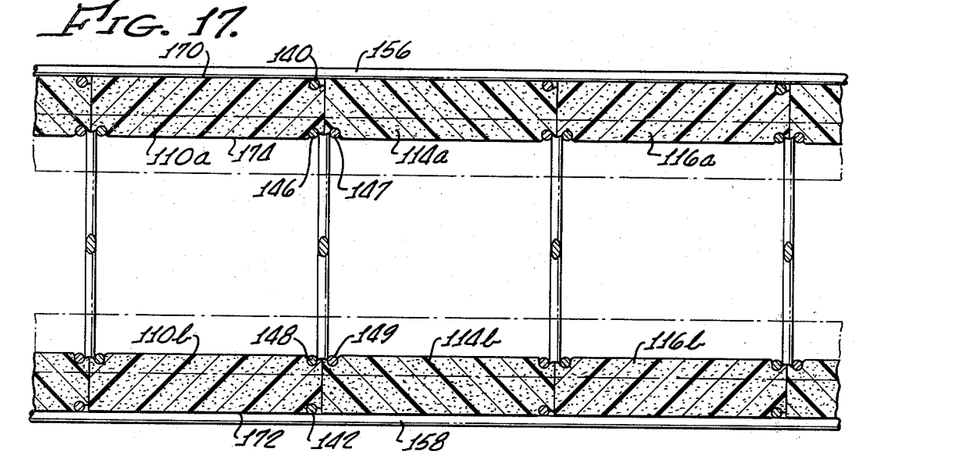
FIG. 17 is a sectional view of a hollow core panel with the filler element sections in their outwardly displaced position.
Figure 18:
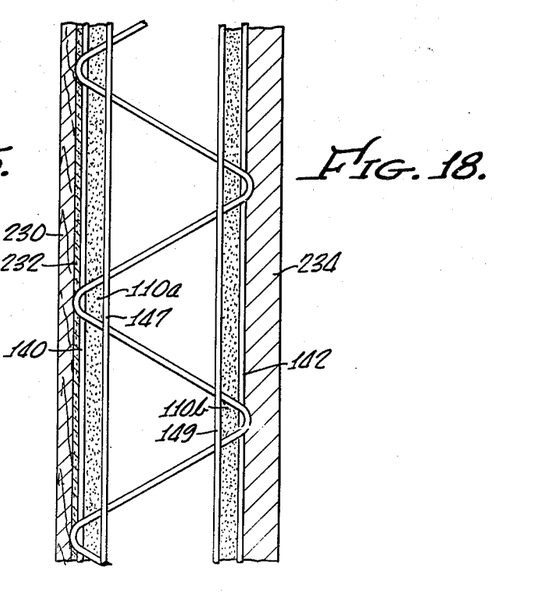
FIG. 18 is a sectional view of a hollow core panel used as an interior wall having interior coatings applied to opposite surfaces thereof.

FIGS. 17 and 18 illustrate a modified composite panel having a hollow core and particularly adapted for use as an interior wall of a building. The panel is made in a manner analogous to the method of manufacture of the panel previously described. It is formed of a stack of alternating foam filler elements and trusses. The stack is then compressed and the trusses welded or otherwise rigidly connected to one another by cross wires, just as in the prior embodiment. Each filler element of this hollow core panel is made in two sections and, instead of displacing the entire core in one direction, the two sections of each filler element are laterally displaced outwardly relative to one another so as to be substantially at the opposite exterior matrix sides. This provides a hollow core which is nearly flush with the panel sides on both sides of the panel.

Figures 12, 13:
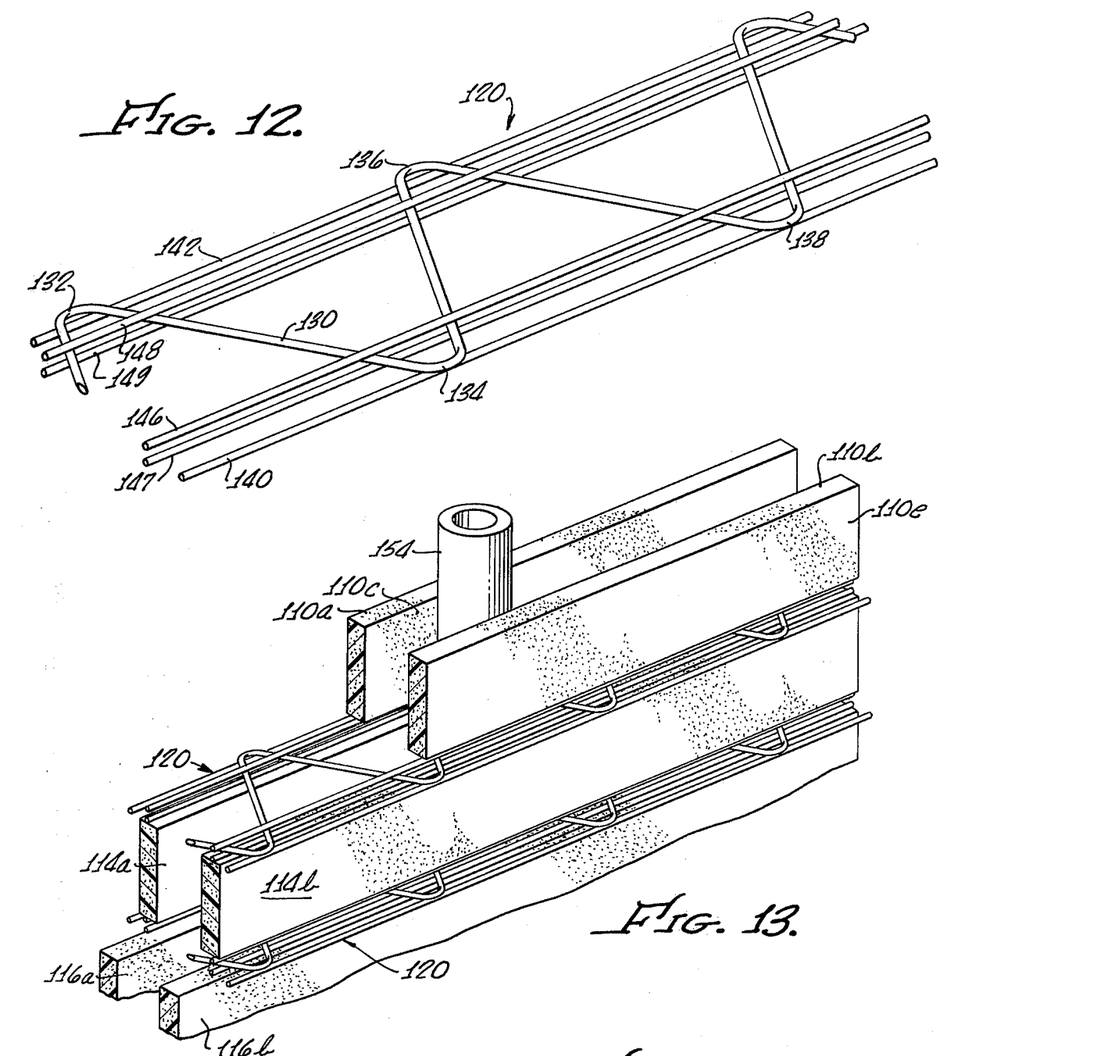
FIG. 12 illustrates a modified truss that is preferably employed in the hollow core panel of FIGS. 17 and 18.
FIG. 13 illustrates a stack of consecutively alternating filler element sections and trusses formed during the manufacture of the hollow core panel, prior to compression of the stack.

For the hollow core panel, each truss 120, as illustrated in FIG. 12, is formed of a pair of parallel, spaced, longitudinally extending side or runner wires 140, 142 interconnected by a continuous sinuously bent strut wire 130 having apices 132, 136 at one edge of the truss and apices 134, 138 on the other edge of the truss. As before, both of the runner wires 140, 142 are welded to the strut wire adjacent the apices thereof on the same side of the strut wire so as to lie in a common plane. Although this arrangement of the side wires 40 and 42 and 140 and 142 lying on the same side of the strut wires is preferred for convenience of manufacture, it will be understood that the runner wires of all embodiments may be connected to the strut wire in other relations.

In the truss of FIG. 12, instead of using a single intermediate wire to form the projections for holding the displaced core element, there is provided a first pair of such intermediate wires 146, 147 adjacent to but spaced from runner wire 140 and positioned respectively on opposite sides of the strut wire 130, being fixedly connected thereto. A second pair of intermediate wires 148, 149 is positioned adjacent the truss wire 142, and the wires of this pair are positioned on opposite sides of the strut wire 130 and welded thereto. All of the wires of this truss are preferably welded to one another at each point of contact therebetween.

The trusses of this hollow core panel, and the trusses of the first described embodiment, may be made by methods and apparatus substantially the same as those described in my copending application for METHOD AND APPARATUS FOR MANUFACTURE OF WIRE TRUSS AND SINUOUS STRUT THEREFOR, filed Feb. 26, 1979, Ser. No. 14,988. The method and apparatus of this co-pending application produce a three-element truss and sinuous strut, but may be readily modified to add one or more intermediate wires or other projections to the finished truss.

Figure 15:
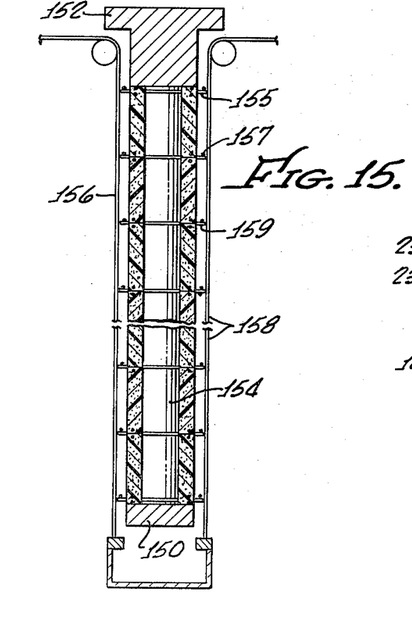
FIG. 15 illustrates compression of the stack of FIGS. 13 and 14.

The spacing of the wire pair 146, 147 from the wire 140, and the spacing of the wire pair 148, 149 from the wire 142 are each equal to or slightly less than the thickness of repsective core filler element sections 110a and 110b (FIGS. 13, 17) which form the several core elements. In this arrangement, as previously mentioned, each filler element is made into two separate sections, such as sections 110a and 110b, and the sectioned core or filler elements are stacked in consecutive alternation with the trusses 120 in a manner similar to the stacking of core elements 10, etc., with truss elements 20, etc., of the previous embodiment. Thus, as illustrated in FIGS. 13 and 15, a stack of alternate trusses and pairs of filler element sections is disposed upon a fixed lower support 150 and beneath a movable upper pressure arm 152. To assist in positioning the filler element sections, an upstanding spacer post 154 is fixed to the lower support 150, extending between the truss strut members and intermediate wires and between each section of a pair of sections of each filler element. Thus, as shown in FIG. 13, filler element 110 is formed of sections 110a and 110b. Section 110a has an inner surface 110c placed against the post 154, and similarly, section 110b has its inner surface placed against the other side of the spacer post 154. Similarly filler element section pairs 114a, 114b and 116a, 116b are stacked alternately with the trusses and have their inner surfaces placed against and positioned by the spacer post 154 of which two or more are provided along the length of filler elements and trusses. Just as in the first embodiment, the flat mutually faced sides of the filler elements facilitate the loose stacking and make good intimate contact with adjacent filler elements over wide areas, after compression. In this initial stacking, the outer surface of each of the fillerelement sections, such as outer surface 110e of section 110b, is positioned inwardly of the laterally outermost portions of the trusses. It is also positioned inwardly of its desired and final position for reasons described above in connection with the embodiment of FIGS. 1 through 11. Nevertheless, it is contemplated that the filler element sections be stacked, prior to compression, in their final lateral position (e.g., nearly flush with the outermost portions of the trusses), thereby avoiding the step of outward shifting, provided that this positon in the stack does not unacceptably interfere with subsequent connection of the cross wires.

In both embodiments, the end-most truss may be positioned or modified so that no intermediate wires project outwardly of the panel. For the hollow core arrangement, this may entail elimination of two intermediate wires on one side of the truss. For the other embodiment, the truss is merely turned.

The stack of filler element sections and trusses is then compressed by moving the pressure arm 152 downwardly, thereby embedding the interposed truss wires in the adjoining surfaces of the filler element sections, and bringing such adjoining surfaces of the filler element sections into flat face-to-face contact over the entire areas thereof except for the areas of the interposed truss wires. After such compression and while holding the stack in compressed condition, cross wires 156, 158 are positioned in the manner similar to that described in connection with the previous embodiment and then welded at each point of contact between such cross wires and the several truss runner wires, thereby holding the compressed assembly in its compressed condition. As before, a number of cross wires are employed, spaced on two inch centers.

Figure 16:
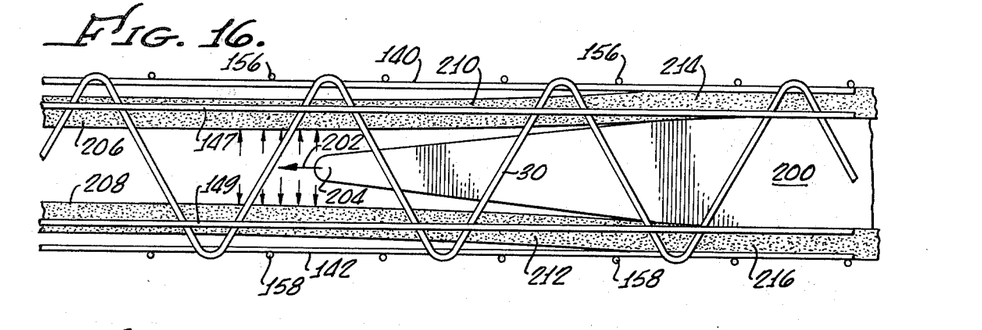
FIG. 16 illustrates the use of a wedge to outwardly displace the filler element sections.

The compressed and welded assembly of trusses and sectioned filler elements is then removed from the support 150 and from spacer poles 154 for the final step in the fabrication process. This is carried out as illustrated in FIG. 16 by inserting a wedge 200 between each pair of adjacent trusses and between the two sections of each sectional filler element. The wedges are moved as indicated by arrow 202 longitudinally of the panel, along its eight-foot dimension, from one end to the other. The narrow end 204 of the wedge is first inserted between the ends of a pair of sections of one of the filler elements and forced to travel between these filler sections, and between adjacent trusses at the sides of the wedge to thereby progressively displace each of the filler element sections relative to one another and outwardly toward the respective outer surfaces of the matrix. This action is illustrated in FIG. 16 which shows a pair of filler sections in compressed but undisplaced position at 206, 208, in partly displaced position at 210, 212, and in fully displaced position at the widest portion of the wedge, at 214 to 216.

Upon completion of the outward displacement of the entire length of each section of each filler element (and after removal of the wedge), the filler element sections are positoned as illustrated in FIG. 17. As before, the laterally outward displacement causes the truss wires, which had been embedded in the contacting surfaces of adjacent filler element sections, to move over these surfaces, depressing surface portions progressively during this movement until the filler element sections reach their outermost positions. In this outermost position, the outer surfaces of filler element sections such as sections 110a, 114, 116a, lie in a common outer plane 170 (FIG. 17) which is tangent to the outer edge of truss runner wires 140 and tangent to the cross wires 156 at the inner sides thereof. Similarly, the outer surfaces of filler element sections 110b, 114b, and 116b lie in a common outer plane 172 tangent to the truss runner wires 142 at the outer sides thereof and tangent to the cross wires 158 at the inner sides thereof.

The filler element sections 110a, 114a and 116a at one side of the panel have inner surfaces thereof lying substantially in a common inner plane 174 that is positioned at or nearly tangent to inner sides of the intermediate wires 146, 147 at one side of the truss. As these sections 110a, 114a, and 116a, etc., are pressed outwardly by the wedge 200, the inner surfaces of the element sections in effect snap over the projections or intermediate wires 146, 147 which are thus received in grooves or depressions at the adjacent inner corners of the several filler element sections. Similarly, the truss runner wires 140 are received in grooves at the adjacent outer corners of the sections. Such grooves are not performed but are formed by the truss wires during the manufacturing operations. The wires 146, 147 which project inwardly from the truss into the space between adjacent trusses on both sides of each truss thus mechanically engage the filler element sections and hold these in their outwardly displaced position.

The same arrangement and relative positioning of the surfaces of the filler element sections 110b, 114b, 116b with respect to the truss runner wires 142 and with respect to the truss intermediate wires 148, 149, occurs on the other side of the composite panel and thus the filler sections at this side of the panel are similarly mechanically retained in place by the projections or intermediate wires 148, 149.

Figure 14:
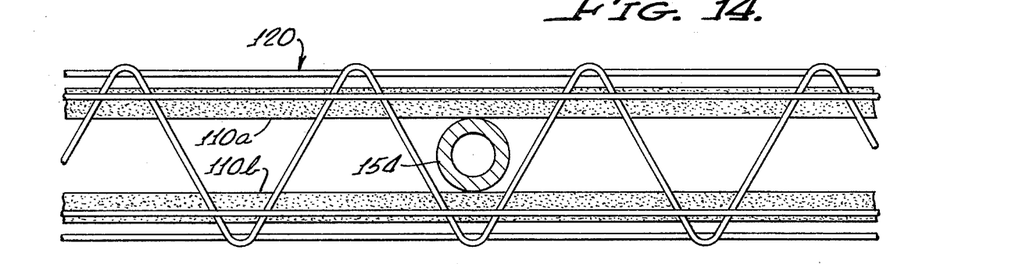
FIG. 14 is a view showing the relation of filler element sections and trusses in the stack.

The filler element sections have a thickness, measured in the vertical direction as viewed in FIG. 17, that is substantially equal to the spacing between an outer side of the truss and the adjacent pair of intermediate wires. This thickness is considerably less than one-half the thickness of the matrix and thus, when stacked for compression as in FIGS. 13, 14, 15, the outer surface of each filler element section will be at or close to the adjacent pair of intermediate wires. Further, this thickness of filler element sections allows the sections to be shifted outwardly into abutment with the cross wires 156, 158 and have their inner surfaces (in this final shifted position) at or inwardly of the intermediate wires for mechanically retaining the sections in offset position.

It is presently preferred to have the filler element retaining projections, whether the single intermediate wire 46 of the first embodiment or the pairs of intermediate wires 146–149 of the second embodiment, positioned at or slightly inwardly of the inner surface of the filler elements. Nevertheless, it will be understood that this relation is not required to enable the projections to hold the filler elements in offset position. The projections will still hold the filler elements when the inner surfaces of the filler elements are inward of the projections. Thus, filler elements of greater thickness (relative to the spacing between intermediate wires and runner wires) may be used, or the outward shifting of filler elements may be stopped short of the illustrated final positions thereof.

It will be seen that there is provided a strong lightweight composite structural panel formed of a wire matrix and a hollow core, the space between element sections on one side of the panel and element sections on the other side of the panel being completely empty except for portions of the several trusses. Further, the outermost surfaces of the filler element sections lie in a common plane and are flush with or nearly flush with the respective outer surfaces of the wire matrix and the filler element sections, all firmly maintained in position by the projections 146-149. Moreover, as in the previous embodiment, the faces of adjoining sections of the filler elements are in direct and substantially complete face-to-face contact over all of the surface thereof except for those portions in contact with the truss wires and are pressed against each other and against the interposed truss wire portions, thereby greatly increasing their own strength and the strength of the interposed truss sections.

The completed prefabricated composite wire and foam panel of FIG. 17 is particularly adapted for use as an interior wall in a residential or commercial building structure. Different types of interior wall coatings may be readily applied thereto. For example, a plywood panel 230 may be secured to one side of the composite panel by means of a relatively thick mastic or other adhesive paste 232. Alternatively, a gypsum board, other drywall, or sprayed or troweled-on plaster or the like, indicated at 234, may be applied to the flush core sections and outer surface of the wire matrix.

The face-to-face contact of adjacent filler elements, having the interposed truss wires embedded therein, provides a number of advantages. This full contact provides an enhanced vapor and moisture barrier, improves the sound and heat insulation characteristics of the panel, and greatly increases panel strength. The increase in panel strength is due in part to the fact that the mutually abutting filler element sections support each other and thus reinforce each other to thereby increase the strength of each, whether in compression or bending. Further, this configuration of abutting solid filler element sections, abutting not only each other but each of the interposed trusses, greatly strengthens the trusses themselves. Each truss, by its two-dimensional nature, has its maximum strength lying in a single plane and, generally, is weaker in its resistance to bending out of the plane of the truss. Such decreased resistance to lateral bending, a bending which would tend to occur when the normally vertically positioned trusses are vertically compressed, each thus acting as a column and being subject to normal column compressive and bending stresses, is significantly resisted by the pressure of the adjoining filler element sections on each side of each truss (except for the outermost trusses). Thus the close juxtaposition and the face-to-face contact of adjoining filler element sections with each other and with the interposed truss greatly strengthens the truss itself.

Although it is presently preferred and found most convenient to make the foam section retaining projections in the form of intermediate wires 46 and 146-149, it is contemplated that projections may be employed other than those formed by these continuous wires. Thus, the strut member itself may be bent or short wire sections may be affixed to the strut member. Further, various types of securing means other than such projections may be applied to the matrix to mechanically or otherwise hold the filler sections in position after they have been outwardly displaced.

There have been described methods and apparatus for construction of offset core composite panels formed of a wire matrix and light-weight filler elements which lend themselves to more efficient and economical use as combined interior/exterior walls, interior walls, roof panels, and other structures. The offset core panels and the improved trusses, therefore, are strong, lightweight, economical, readily manufactured and quickly assembled and finished with any one of a variety of coating materials.

The foregoing detailed description is to be clearly understood as given by way of illustration and example only, the spirit and scope of this invention being limited solely by the appended claims.

What is claimed is:

1. A method of making a reinforced panel comprising the steps of:
    stacking a plurality of elongated filler elements and a plurality of substantially flat lattice structures in consecutive alternation with sides of said filler elements spaced inwardly of laterally outermost portions of said lattice structures,
    fixedly securing said lattice structures to one another, and
    laterally shifting at least a portion of each of a group of said filler elements outwardly to a displaced position in which outer sides of said shifted portions at one side of said panel are positioned substantially at said lateral outer portions of said lattice structures at said one panel side.

2. A panel made by the method of claim 1.

3. The method of claim 1 including the step of mechanically securing said shifted portions in said displaced position.

4. The method of claim 3 wherein said step of mechanically securing said shifted portions includes locating projections on said lattice structures extending into the path of shifting of said portions, and shifting said portions into engagement with said projections.

5. The method of claim 1 wherein said step of shifting portions of said filler elements comprises the step of shifting all of each filler element of said group so that outer sides of said shifted filler elements at the other side of said panel are positioned inwardly of lateral portions of said lattice structures on said other panel side.

6. A panel made by the method of claim 5.

7. The method of claim 5 wherein said step of shifting comprises passing said panel across a roller having a plurality of mutually spacing pressure feet and forcing said pressure feet against sides of said filler elements.

8. The method of claim 1 wherein each filler element of said group comprises first and second element sections extending longitudinally along said lattice structures, and wherein said step of shifting at least a portion of filler elements of said group comprises the step of relatively shifting the sections of each filler element of said group laterally outwardly with respect to one another to provide a space within the panel flanked on either side thereof by opposed sections of said filler elements.

9. A panel made by the method of claim 8.

10. The method of claim 1 wherein said step of stacking comprises positioning sections of each of said filler elements in mutually spaced relation, and wherein said step of relatively shifting comprises increasing the spacing between sections of said filler elements.

11. The method of claim 10 wherein said step of increasing spacing comprises inserting a wedge between sections of a filler element.

12. The method of claim 1 including the step of attaching a panel finishing sheet to said outer sides of said shifted filler elements.

13. The method of claim 1 including the step of forming said lattice structures by interconnecting a pair of mutually spaced longitudinally extending side wires to each other by means of a plurality of transverse members extending between said side wires, and interconnecting a third longitudinally extending wire to said transverse members between the wires of said first mentioned pair of side wires.

14. The method of claim 13 including mechanically retaining said shifted filler elements in displaced position by engaging them with said third wire.

15. The method of claim 1 including the step of forming said lattice structures with longitudinally extending intermediate wires positioned laterally inwardly of said lateral outer portions thereof and extending into the path of said shifting, said step of shifting comprising mechanically engaging said intermediate wires and filler element portions.

16. The method of claim 1 including the step of forming said lattice structures with projections extending into the space between adjacent lattice structures and spaced laterally inwardly of said lateral outer portions of said lattice structures, whereby the space between projections of one lattice structure and an adjacent lattice structure is less than the width of said filler elements, said step of shifting comprising moving said filler elements outwardly against said projections whereby said filler elements are pressed against said projections and said projections restrain displacement of the filler elements from shifted position.

17. A panel made by the method of claim 16.

18. The method of claim 1 wherein said step of stacking filler elements and lattice structures comprises forming said filler elements in first and second filler element sections, each having a width less than the width of said lattice structures, and positioning the sections of each filler element in mutually spaced relation, and wherein said step of shifting said filler elements comprises shifting the sections of each filler element outwardly relative to one another to thereby position the filler element sections at outer sides of said panel so as to provide a hollow space in the interior of said panel between sections of said filler elements.

19. The method of claim 1 including the step of compressing said stacked lattice structures and filler elements to at least partially embed the lattice structures in said filler elements before said step of fixedly securing, and performing said step of fixedly securing while said structures and elements are in compressed condition.

20. A structural building panel comprising:
a plurality of mutually spaced wire trusses,
a plurality of mutually spaced transverse connecting members fixed to and interconnecting said trusses on opposite sides thereof to define a threedimensional matrix having first and second opposite matrix sides, said transverse members being positioned at said matrix sides,
a first group of elongated filler elements within said matrix, each said element being located between a pair of adjacent trusses and each having an outer surface, all of said filler element outer surfaces having points lying in a common plane at one of said matrix sides, each said truss comprising first and second longitudinally extending outer side wires, an intermediate wire extending parallel to and between said first and second side wires, said intermediate wire being spaced from said first side wire by a distance considerably greater than the spacing thereof from said second side wire, said distance being substantially the same as the thickness of elements of a group of said filler elements and wherein said intermediate wire is at least partly free of said filler elements.

21. A structural building panel comprising:
a plurality of mutually spaced wire trusses,
a plurality of mutually spaced transverse connecting members fixed to and interconnecting said trusses on opposite sides thereof to define a threedimensional matrix having first and second opposite matrix sides, said transverse members being positioned at said matrix sides,
a first group of elongated filler elements within said matrix, each said element being located between a pair of adjacent trusses and each having an outer surface, all of said filler element outer surfaces having points lying in a common plane at one of said matrix sides, each said truss comprising first and second longitudinally extending outer side wires, an intermediate wire extending parallel to and between said first and second side wires, said intermediate wire being spaced from said first side wire by a distance considerably greater than the spacing thereof from said second side wire, an exterior structural panel coating applied to said matrix in contact with said filler elements and in contact with both said second and intermediate wires of said trusses and the transverse members at the other side of said matrix, said coating having an outermost surface positioned outwardly of the other side of said matrix whereby portions of said matrix including said second and intermediate truss wires are embedded in said exterior coating for protection of said matrix and reinforcement of said coating.

22. The structural panel of claim 21 including an interior surface coating on said one side of said matrix in contact with all of said outer surfaces of said filler elements, said side wires, and said transverse members on said one side of said matrix.

23. The method of forming a composite building panel in which a three-dimensional wire matrix is made of a plurality of interconnected trusses and combined with a panel filler, said method comprising:
sinusoidally bending a strut wire to provide a continuous strut having oppositely disposed apices interconnected by diagonal wire portions,
positioning first and second mutually spaced side wires along said strut wire adjacent said strut wire apices on opposite sides thereof,
positioning an intermediate wire between said side wires and spaced from said first side wire by a distance greater than its spacing from said second side wire,
attaching each said side wire to said strut wire adjacent respective strut wire apices,
attaching said intermediate wire to said strut wire diagonal portions at points spaced from but adjacent to apices along one side of said strut wire, to thereby form a wire truss, and
positioning a plurality of filler elements in said matrix to form said panel filler, said step of attaching said intermediate wire comprising spacing said intermediate wire from the other side of said strut wire by a distance substantially equal to the thickness of said filler elements.

24. A truss made by the method of claim 23.

25. A composite structural building panel comprising: a three-dimensional wire matrix comprising
 a plurality of intersecting wires extending along and defining first and second matrix surfaces, and
 a plurality of strut members interconnecting wires of said surfaces, and
a core formed of light-weight filler material within said matrix and having first and second outer surfaces substantially parallel to respective matrix surfaces, said core being offset to a position in which said first core surface is at said first matrix surface and said second core surface is displaced inwardly of said second matrix surface, whereby a relatively thick coating of exterior material may be applied at said second matrix surface to said core and matrix, and a relatively thin coating of interior material may be applied at said second matrix surface to said matrix and core, said matrix being formed of a plurality of trusses extending between said matrix surfaces and interconnected by cross wires extending along said surfaces, each said truss comprising a first and second runner wire extending along said matrix surfaces, said strut members interconnecting said runner wires, and an intermediate runner wire connected to said strut members, said intermediate wire being spaced from said first runner wire by a distance substantially equal to the thickness of said core and spaced from said second runner wire by a distance substantially equal to the spacing of said second core surface from said second matrix surface.

26. The panel of claim 25 including means on said strut members engaging said core for maintaining the core in said offset position.

* * * * *